United States Patent
Ruiz Alonzo et al.

(10) Patent No.: US 8,966,559 B2
(45) Date of Patent: Feb. 24, 2015

(54) METHOD AND DEVICE FOR ENSURING RELIABILITY DURING TRANSMISSION OF TELEVISION DATA IN A TELEVISION SYSTEM BASED ON INTERNET PROTOCOL

(75) Inventors: Jaime Ruiz Alonzo, Madrid (ES); Alvaro Villegas Nunez, Madrid (ES)

(73) Assignee: Alcatel Lucent, Boulogne-Billancourt (FR)

( * ) Notice: Subject to any disclaimer, the term of this patent is extended or adjusted under 35 U.S.C. 154(b) by 300 days.

(21) Appl. No.: 13/144,314

(22) PCT Filed: Dec. 10, 2009

(86) PCT No.: PCT/EP2009/066830
§ 371 (c)(1),
(2), (4) Date: Sep. 30, 2011

(87) PCT Pub. No.: WO2010/081599
PCT Pub. Date: Jul. 22, 2010

(65) Prior Publication Data
US 2012/0110629 A1 May 3, 2012

(30) Foreign Application Priority Data
Jan. 13, 2009 (EP) .................................... 09382001

(51) Int. Cl.
*H04N 7/173* (2011.01)
*H04N 21/643* (2011.01)
(Continued)

(52) U.S. Cl.
CPC ..... *H04N 21/64322* (2013.01); *H04N 21/2381* (2013.01); *H04N 21/4381* (2013.01);
(Continued)

(58) Field of Classification Search
CPC ........ H04L 1/16; H04J 3/0664; H04J 3/0667; H04N 21/2368; H04N 21/4341; H04N 21/6375
USPC ................................... 725/109–110; 713/171
See application file for complete search history.

(56) References Cited

U.S. PATENT DOCUMENTS

| 2002/0039371 A1 | 4/2002 | Hedayat et al. | |
|---|---|---|---|
| 2006/0112272 A1* | 5/2006 | Morioka et al. | 713/171 |
| 2009/0235321 A1* | 9/2009 | Wu et al. | 725/109 |

FOREIGN PATENT DOCUMENTS

| WO | WO 2007/095550 A2 | 8/2007 |
|---|---|---|
| WO | WO 2009/036378 A1 | 3/2009 |

OTHER PUBLICATIONS

Chung Kei Wong et al., "Digital Signatures for Flows and Multicasts," IEEE/ACM Transactions on Networking, vol. 7, No. 4, XP011039222, pp. 502-513, Aug. 1, 1999.

(Continued)

*Primary Examiner* — Hai V Tran
(74) *Attorney, Agent, or Firm* — Fay Sharpe LLP

(57) ABSTRACT

A coding/transmitter device (11) includes a broadcasting module (12) in order to broadcast television to a plurality of STB receiver/decoder devices (15) via an IP/Internet network (14), so that the clients-subscribers are provided with a first UDP stream and a second UDP stream which includes identification data associated with data packets transmitted within the first UDP stream in order to provide functionalities such as reorganization of packets, detection of losses, requests for retransmission etc. without adding headers according to the RTP protocol, but with a reliability and capability of inserting additional data comparable to that provided by the RTP protocol.

10 Claims, 1 Drawing Sheet

(51) Int. Cl.
- H04N 21/2381 (2011.01)
- H04N 21/438 (2011.01)
- H04N 21/6375 (2011.01)
- H04N 21/6377 (2011.01)
- H04N 21/658 (2011.01)
- H04N 21/8358 (2011.01)
- H04L 29/06 (2006.01)

(52) U.S. Cl.
CPC ....... *H04N21/6375* (2013.01); *H04N 21/6377* (2013.01); *H04N 21/658* (2013.01); *H04N 21/8358* (2013.01); *H04L 65/4076* (2013.01); *H04L 65/608* (2013.01)
USPC ............................ 725/110; 725/105; 725/109

(56) References Cited

OTHER PUBLICATIONS

International Search Report for PCT/EP2009/066830 dated Feb. 11, 2010.

* cited by examiner

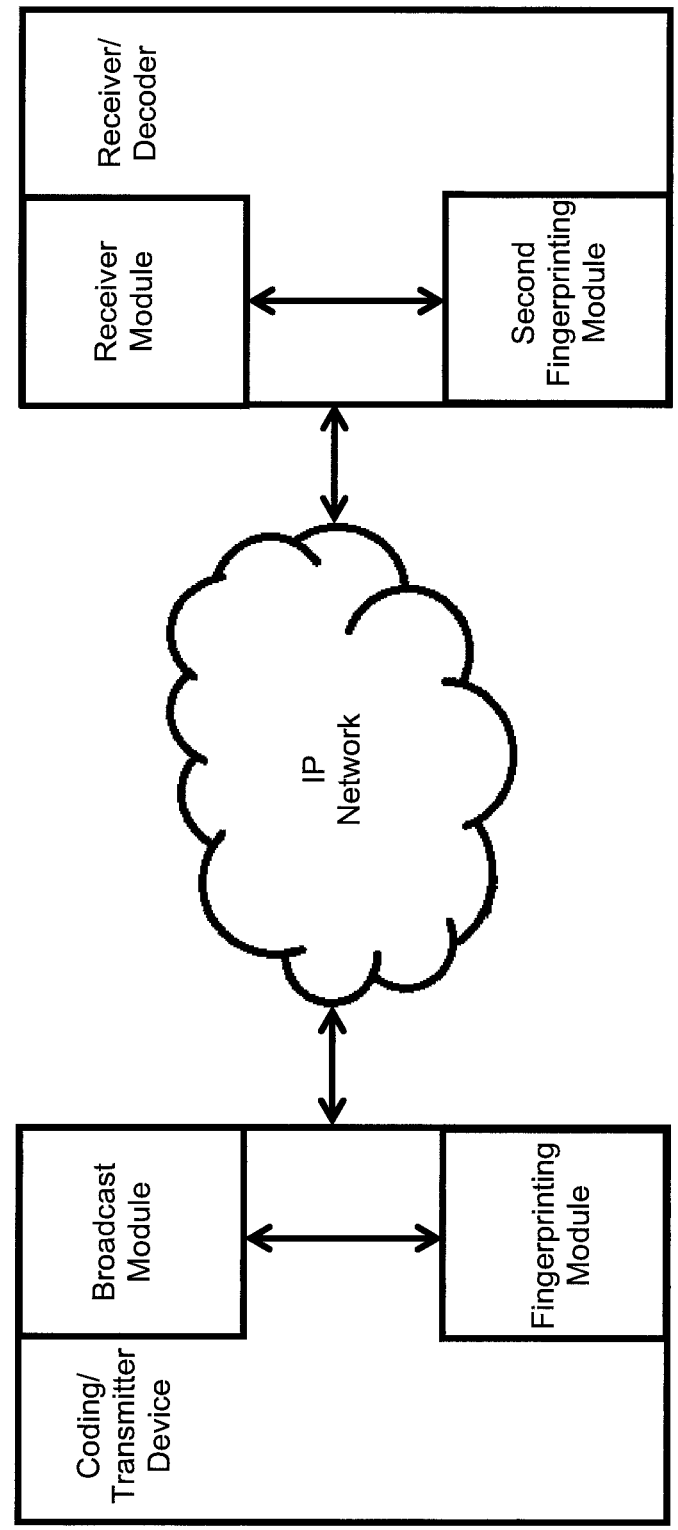

METHOD AND DEVICE FOR ENSURING RELIABILITY DURING TRANSMISSION OF TELEVISION DATA IN A TELEVISION SYSTEM BASED ON INTERNET PROTOCOL

OBJECT OF THE INVENTION

The present invention refers in general, to Internet Protocol television, IPTV and in particular, to a method and device for transmitting multimedia television content from a digital television platform to a plurality of clients through a telecommunications network, such as a network based on Internet protocol, Internet/IP protocol.

STATE OF THE ART

The broadcasting of television and video signals on demand from an IP network on broadband connections is becoming increasingly common. In IPTV a number of digital television services are supplied to consumers who use IP Protocol, being typically supplied by a broad band operator which uses the Internet/IP network infrastructure.

IPTV covers both active television in multicasting as well as video on demand, or VOD. IPTV requires a decoder device for subscribers or a television decoder interface, that is, a set top box or STB, connected to a television screen.

The multimedia content received for decoding and showing on screen may be supplied through multicasting (IP), where the information is transmitted simultaneously to the group of receivers/decoders or STB interface.

Generally, in a multicast IPTV system the user datagram protocol or UDP is used, without connection, as it is fast and because the packets with UDP format include a reduced packet header compared to a transmission control protocol or TCP header.

In the UDP protocol datagrams are generated which are transmitted according to the IP protocol which defines a packet switching network and which links the different operator devices with the subscribers' STB interfaces. Each packet is transmitted with the STB interface address where it is to be received or with a multicasting address and each packet is transmitted independently from the others through the IP network until it reaches its destination.

The TCP format provides a reliable transport service for packets as for example; it also retransmits any lost data packets.

For this purpose, the TCP protocol fragments the information and transmits and numbers each packet, that is, it assigns an identification label so that the receiver of the packet stream can order them on receipt should they arrive in a disordered form or if any packet does not reach its destination.

However, the UDP protocol does not provide guarantees of reliable transmission of information provided by the TCP protocol, therefore, it does not verify that the packets reach their destination, and thus it does not provide guarantees that they will arrive in order, that all the packets are received, or that there are no errors in the information in contains. In the latter case, the packet involved is set aside in the network layer and is not delivered to the application layer.

The UDP protocol does not have the means to remedy possible deficiencies mentioned previously as the overload of headers, retransmissions and two-way communications which provide reliability, packets in TCP format, are disproportioned for the flow of multimedia data.

A disadvantage of the TCP header is that it introduces delays in the transmission which are not assumable in IPTV.

Therefore, the UDP protocol is used normally for multimedia streaming applications (audio, video etc) where the prompt arrival of the packets is more important than the reliability provided by information, so that the receiver communicates the success or failure of the transmission information which identifies the packet received and information from the previous and subsequent packet, in order to maintain the order of the packets sent.

The multimedia transmissions specify that the STB interface receive packets in real time. However, there are STB interfaces which are not able to detect and act in the event of loss, disorder and corruption of data packets.

Consequently, if during transmission of data packets according to the UDP protocol, any error occurs, the STB interface is unable to notify any event during reception of the packets and acts in consequence for example, requesting the resending the packets involved.

Moreover, the UDP protocol has no means of inserting additional data associated with the video, as its payload is a bare sequence of video layer packets such a sequence of MPEG2 Transport Stream packets.

As a remedy for some of the problems described above the RTP protocol has been designed to add a header to the UDP format, containing information to identify the packet received and, therefore, usable with data packets in real time such as multimedia audio and video streaming which is mounted on UDP format.

The RTP protocol in addition permits additional information to be transmitted, associated with the audio and video flow which enables added value services to be implemented, such as rapid changing of channel, recovery in the event of FEC (Forward Error Correction), data synchronised with the video, etc.

It should be noted that a number of STB interfaces are installed which are able to extract information contained in RTP format headers.

It should however be noted as well that many legacy STB interfaces currently installed are not able to understand the RTP protocol format and cannot work at all with multimedia streams encapsulated in RTP. If the multimedia stream is exclusively encapsulated with RTP protocol, these legacy STB interfaces will stop working.

The generation and insertion of RTP headers in the main multimedia flow requires in general a major change in the main path of the multimedia stream, including the replacement of updating of the devices in charge of encapsulating the MPEG2 Transport Stream packets at the Headend

CHARACTERISATION OF THE INVENTION

This invention seeks to resolve or reduce one or more of the disadvantages mentioned above by means of a method and a device for ensuring reliability during transmission of digital television data streams on Internet protocol and inserting additional information associated to video for enabling added value services according to Claim 1. Embodiments of the invention are established in the dependent claims.

One object of the invention is to provide a method and system for transmitting television data streams, according to the UDP protocol via an internet protocol telecommunications network, in a manner that does require a change in the current format of the main video stream and therefore does not interfere with the operation of legacy STB interfaces which are installed in the field Another object of the invention is to send additional information associated to the video data through a separate stream that can follow an independent path and can therefore be handled independently by the network equipment and even be filtered out at certain locations if desired Yet another object of the invention is to generate the stream with the additional information using a separate device at the Headend which does not interfere with the main UDP stream and therefore does not require any changes in the currently installed encapsulators.

Another object of the invention is to enable the deployment of the added value services in a gradual manner in space and time

BRIEF DESCRIPTION OF THE FIGURES

A more detailed explanation of the invention is given in the following description based on the attached figures in which:

FIG. 1 shows a block diagram of a system for television transmission in accordance with the invention.

DESCRIPTION OF THE INVENTION

In relation to FIG. 1, the method of the invention permits transmission in broadcast and unicast data streams relating to multimedia contained according to UDP protocol via a telecommunications 14 network such as an Internet/IP network in a reliable manner, ensuring high reliability of the multimedia signal transmitted and including information which enables added value services.

The method is applicable to data streams based on conventional UDP protocols, thus interoperability with coding/transmitter 11 devices of existing content suppliers is maintained.

The UDP television data stream generated may be a data stream for extensive multicasting.

A coding/transmission 11 device, belonging to a multimedia content supplier, including a broadcast 12 module for broadcasting television to a plurality of receiver/decoder 15 devices or set top box STB television decoder interfaces, associated with subscribers via the IP network 14, so that the customers-subscribers are provided with broadcasting services in which MPEG-2 transport stream packets are transmitted in multicast, unicast or broadcast using UDP protocol, without adding headers according to RTP protocol, however with a reliability and capability of sending additional information comparable to that provided by the RTP protocol, as will be shown hereafter.

The broadcasting module 12 compresses and encapsulates the contents to be transmitted, MPEG streams in standard UDP format, generating in one of its outlets a first UDP packet stream and transmitting it to the STB interfaces 15 of the subscriber side of the IP network 14.

Furthermore, the coder/transmitter device 11 includes a first fingerprinting module 13 which receives the first UDP stream generated by the broadcasting module 12, reads it, generates a packet identification data applying a fingerprinting technique on each packet of the first UDP stream, encapsulates this identification data with some additional information associated to the packet and transmits it on a second UDP data stream via one of its outlets.

The second UDP data stream is transmitted on a second communications channel different from a first communications channel on which the first UDP stream is transmitted to the group of STB interfaces 15.

The fingerprinting technique enables a series of associated identification parameters to be obtained in order to form a fingerprint which unequivocally identifies each UDP packet of the first UDP data stream.

Therefore, the fingerprinter module 13 generates with the identification data associated to each UDP packet of the first UDP stream plus the additional information associated to it a second UDP data stream.

It should be noted that the second UDP data stream includes identification data of packets associated with the packets transported within the first UDP transport stream, together with information associated with that identification data, which is equivalent to the information carried by other protocols such as RTP.

From the coding/receiver device 11 both first and second UDP streams are transmitted on parallel canals to the subscriber side, being received by the receiver module of the STB interface 15.

The receiver module 16 receives the first UDP stream and redirects it to a decoding module of the STB interface 15, so that it may be decoded and the decoded outlet signal is retransmitted to the television screen for viewing of the multimedia signal received, in exactly the same way as it is done by all currently installed legacy STB interfaces.

The receiver module 16 also receives the second UDP stream and it redirects it to a second digital fingerprint module 17, which extracts from the second UDP stream the identification data, expected fingerprint of each one of the data packets received within the first UDP stream.

In parallel, the second fingerprinter 17 of the STB interface 15 carries out the fingerprinting process on each UDP packet received within the first UDP stream which contains the audio, video and data. Obviously the receiver module 16, also redirects the first UDP stream to the second fingerprinter 17 to enable this process.

It should be noted that the fingerprint algorithm implemented by the second fingerprinter module 17 is the same as the algorithm implemented at the server side by the fingerprinter module 13, so if both modules act on the same UDP packet they should obtain the same result, i.e. the same fingerprint.

By comparing the fingerprinting data received in the second UDP stream and extracted by module 17 with the fingerprinting data calculated locally on the first UDP flow, also by module 17, the STB interface 15 is able to identify the UDP packets of the first flow (audio, video) to learn the information associated with these which arrives in the second flow and is also extracted by module 17.

To summarise, the second fingerprinter 17 receives the second UDP stream which contains the fingerprinting data calculated in the first fingerprinter 13 of the supplier's server 11, and extracts from it the information associated with each UDP packet of the first UDP flow.

This associated information is equivalent to that included in other protocols such as RTP, and it therefore permits functionalities to be implemented such as rearrangement of packets, detection of losses, retransmission requests etc in the system described here.

Therefore, in the event that the second fingerprinter module 17 detects the absence of a packet, or a packet with errors etc.; the second fingerprinter 17 or other module may generate a request message which includes identification data associated with the erroneous packet.

The aforementioned request is transmitted from the STB interface 15 to the coder/receiver device 11 so that the packet in question is retransmitted.

As a result of the foregoing, if a legacy STB interface 15 does not include the aforementioned second fingerprinter module 17, it will receive a second UDP stream, however it will be unable to read it and extract the fingerprint information contained in the second UDP stream and it will not be able to carry out functions deriving from the fingerprinting technique, such as additional services of rapid channel switching, recovery in the event of FEC errors, data synchronised with the video etc for example.

In any case, the first UDP stream is read by the legacy STB interface 15, which has not been altered, and therefore its functioning will continue to be the same as prior to the introduction of the second UDP stream.

Consequently, the supplier may deploy and/or gradually update STB interfaces 15 currently installed, thus permitting some STB interfaces 15 to be maintained indefinitely without the new functionalities, without it being necessary to interrupt the service at any time.

In addition, it should be noted that this invention may be implemented by a variety of environments with means which can be read by a computer which includes readable codes which can be read by programmable computers which include processing components, storage devices from a storage system readable by a computer, which includes memory devices of a volatile or non volatile memory system.

The logics of both first and second fingerprinters execute various sets of instructions or programmes which are applied to the data packets in order to carry out the previously described functions.

The programmes used by the hardware modules described above may be implemented, preferably in various programming languages.

Each computer programme is preferably stored in a module or storage device which is readable by a computer programmable for general or special use, in order to configure and operate the computer when the module or storage device is read by the computer in order to execute the previously described procedures.

Furthermore, it may be considered that the first and second fingerprinters may be implemented as a module readable by a computer, configured with a computer programme, which enables the computer to function in a previously specified and predefined manner.

The description as explained herein is not considered to be exhaustive or to restrict the invention to the precise form in which it is described. Modifications and variations are possible in the light of the above teaching without abandoning the spirit and scope of the following claims.

The invention claimed is:

1. Method for ensuring reliability and inserting additional data associated to video streams during transmission of the television data streams from a coding/transmitter device to a group of STB decoder/receiver devices via an Internet protocol telecommunications network, the method comprising:
   generating and broadcasting a first UDP data stream from a broadcasting module included in the coder transmitter device to the STB decoder/receiver device, wherein packets in the first UDP stream do not include real-time transport protocol (RTP) type headers;
   supplying the first UDP data stream from the broadcasting module to a transmitter fingerprint module included in the coder transmitter device;
   generating in the transmitter fingerprint module identification data associated with each data packet included in the supplied first UDP stream;
   broadcasting from the transmitter fingerprint module a second UDP data stream including the identification data generated to the STB decoder/receiver devices;
   receiving in a receiver module included in the STB receiver/decoder device the first UDP data stream and the second UDP data stream sent over first and second data channels;
   transmitting the first UDP data stream received to a receiver fingerprint module included in the STB receiver/decoder device, the receiver fingerprint module being operable to calculate identification data associated with each of the data packets included in the received first UDP data stream;
   supplying to the receiver fingerprint module the second UDP data stream received to replicate the identification data generated by the transmitter fingerprint module and associated with each data packet of the first UDP stream received; and
   comparing, by the receiver fingerprint device, each of the calculated identification data associated with the first UPD data stream by the receiver fingerprint module with each of the replicated identification data associated to the second UDP data stream received from the transmitter fingerprint module;
   based on the result of the comparison, detecting at least one of an error in one or more UDP data packets or the absence of one or more UDP packets; and
   requesting retransmission of the one or more detected UDP packets from the receiver/decoder device.

2. A first non-transitory computer-readable module that stores instructions for execution by a computer in the coding/transmission device to perform the method in accordance with claim 1.

3. A second non-transitory computer-readable module that stores instructions for execution by a computer in the coding/transmission STB device to perform the method in accordance with claim 1.

4. A receiver fingerprint device that facilitates updating an STB receiver/decoder for receiving television data streams from a coding/transmission device via an Internet protocol telecommunications network, wherein:
   the receiver fingerprinting device is electrically connectable to a receiver of the STB receiver/decoder device so that the receiver fingerprint device receives a retransmitted second UDP stream received by the receiver from the receiver;
   wherein the receiver fingerprint device extracts from the second UDP stream identification data associated with packets included in a first UDP stream also received by the receiver, wherein packets in the first UDP stream do not include real-time transport protocol (RTP) type headers;
   wherein the first UDP stream and the second UDP stream are received over first and second data channels;
   wherein the receiver fingerprint device calculates identification data associated with each of the data packets included in the received first UDP stream;
   wherein the receiver fingerprint device replicates identification data generated by a transmitter fingerprint device and associated with each data packet of the first UDP stream received; and
   wherein the receiver fingerprint module compares the calculated identification data associated with the first UPD stream by the receiver fingerprint device with the replicated identification data associated with the second UDP stream received from the transmitter fingerprint device to detect a mismatch in order to enable retransmission of one or more missing UDP packets from the receiver/decoder device to be requested.

5. The receiver fingerprinting device in accordance with claim 4 including, based on the identification data extracted by the receiver fingerprint module of the STB receiver/decoder device, carrying out functionalities including one or more of reordering packets of the first UDP stream received, detecting the loss of any packet of the first UDP stream received, requesting retransmission of any of the first UDP stream packets.

6. Coding/transmission device for transmitting television data streams to a group of STB receiver/decoder devices via an internet protocol telecommunications network comprising a transmitter fingerprinting module electrically connectable to a broadcasting module of the coder/transmitter device so that the transmitter fingerprinting module reads a first UDP stream in order to generate and associate the identification of each packet of the first UDP stream, wherein packets in the first UDP stream do not include real-time transport protocol (RTP) type headers;

wherein the first UDP stream and a second UDP stream are transmitted over first and second data channels; and wherein the transmitter fingerprint module calculates identification data associated with each of the data packets included in the first UDP stream and transmits the calculated identification information in the second UPD stream to a receiver fingerprint module for comparison to independently-generated identification data generated thereby and associated with each data packet of the first UDP stream transmitted and for enabling a retransmission request of the UDP packets upon a determination that the comparison of the identification data generated by the transmitter fingerprint module to the identification data independently generated by the receiver fingerprint module indicates that one or more UDP packets is missing or includes an error.

7. Device in accordance with claim 6 wherein the transmitter fingerprinting module generates and transmits a second UDP data stream associated with the generated identification, to the STB receiver/decoder devices.

8. STB receiver/decoder device for receiving television data streams from a coding/transmission device via an internet protocol telecommunications network comprising a receiver fingerprinting module electrically connectable to a receiver module of the STB receiver/decoder, wherein the receiver module retransmits the second UDP stream received by the receiver module to the receiver fingerprint module in order to extract identification data associated with packets included in a first UDP stream also received by the receiver module, wherein packets in the first UDP stream do not include real-time transport protocol (RTP) type headers;

wherein the first UDP stream and the second UDP stream are received over first and second data channels;

wherein the receiver fingerprint module calculates identification data associated with each of the data packets included in the received first UDP stream;

wherein the receiver fingerprint module replicates identification data generated by a transmitter fingerprint module and associated with each data packet of the first UDP stream received; and wherein the receiver fingerprint module compares each of the calculated identification data associated with the first UPD stream by the receiver fingerprint module with each of the replicated identification data associated with the second UDP stream received from the transmitter fingerprint module;

based on the result of the comparison, detecting at least one of an error in one or more UDP data packets or the absence of one or more UDP packets; and requesting retransmission of the detected UDP packets from the receiver/decoder device.

9. Device in accordance with claim 8 wherein the receiver fingerprint module, on the basis of identification data extracted from the second UDP stream, performs functions including one or more of reordering the packets of the first UDP stream received, detecting the loss of any packet of the first UDP stream received, requesting retransmission of any packets of the first UDP stream received.

10. A transmitter fingerprint device that facilitates updating a coding/transmission device for transmitting television data streams to a group of STB receiver/decoder devices via an internet protocol telecommunications network, wherein:

the transmitter fingerprinting device is electrically connectable to a broadcasting module of the coder/transmitter device, so that the transmitter fingerprint device retransmits a second UDP stream including identification data associated with packets included in a first UDP stream transmitted, wherein packets in the first UDP stream do not include real-time transport protocol (RTP) type headers;

wherein the first UDP stream and the second UDP stream are transmitted over first and second data channels; and wherein the transmitter fingerprint device calculates identification data associated with each of the data packets included in the first UDP stream and transmits the calculated identification information in the second UPD stream to a receiver fingerprint device for comparison to independently-generated identification data generated thereby and associated with each data packet of the first UDP stream transmitted, and for enabling a retransmission request of the UDP packets upon a determination that the identification data calculated by the transmitter fingerprint device matches the identification data independently generated by the receiver fingerprint device.

* * * * *